Egge & Churchill,
Thread Cutter.
No. 107,016.   Patented Sep. 6, 1870.

WITNESSES
T. Skaats
L. A. Hubbell

INVENTORS
Fredrick Egge
R. W. Churchill

United States Patent Office.

FREDRICK EGGE AND ROBERT W. CHURCHILL, OF BRIDGEPORT, CONNECTICUT.

Letters Patent No. 107,016, dated September 6, 1870.

IMPROVEMENT IN IMPLEMENT FOR CUTTING THREAD.

The Schedule referred to in these Letters Patent and making part of the same.

We, FREDRICK EGGE and ROBERT W. CHURCHILL, of Bridgeport, county of Fairfield, State of Connecticut, have invented certain Improvements in Selvage and Thread-cutting Machines, of which the following is a specification.

Nature and Object of our Invention.

Our invention relates to that class of machines or implements, combining two levers, provided with cutting-edges or knives, to operate on both sides of the material to be cut, said levers being constructed in circular form and size suitable to easily slip on the finger.

The object of our invention is to produce a cutting implement compact in form, and easily operated by the finger.

Description of Accompanying Drawing.

Figure 1:
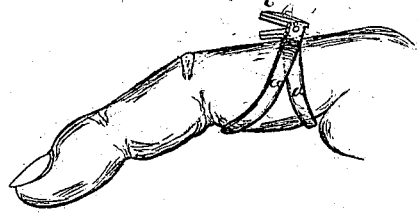

Figure 1 shows the implement adjusted and ready for use.

Figure 2:
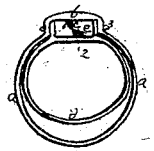
Figure 3:
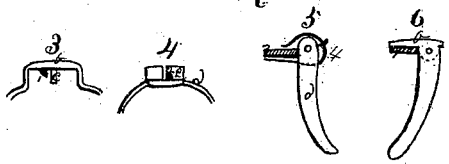

Figure 2, a front view of same.

Figures 3, 4, 5, and 6, details of same.

General Description.

*a*, figs. 1 and 2, is a circular-shaped lever, with the head or shield *b*, provided with hinge-joint *c*.

Cutter 1, within this lever, another lever, *d*, with hinge-joint *e*, and cutter 2, work on the pin 3.

The spring 4 is secured to the inner lever *d*, and keeps the cutting-jaws open to receive the material to be cut.

We construct our invention as follows:

The outer lever *a* is formed to the finger, its lower circumference being bent forward to gain length of lever. The head or shield *b* is raised a sufficient distance from the finger to admit of hinge-joint *c*, cutter 2, and spring 4, and is connected and operated in conjunction with lever *a* and cutter 1 by the pin 3.

We can construct our invention of any of the malleable metals. Its operation is easily understood.

We slide the implement onto either finger desired, the cutter toward the nails. The spring keeps the cutter open a width sufficient to admit the material to be cut.

The bend or form of levers *a* and *d* is such that, when the cutters are open, their outer edges reach the joints of the finger when extended.

The material to be cut is placed between the cutters, the finger bent toward the palm of the hand. This forces the levers together, and shuts the cutters 1 and 2. They, operating with each other, cut the material.

The cutters 1 and 2, of steel, can be readily sharpened by removing pin, and using a fine file on edges of cutter.

By the addition of ornaments, the implement can be made a neat piece of jewelry.

We do not claim as novel the cutters or hinge-joint of same worked by levers, only the manner of construction and application.

We do not confine ourselves to the bending of the levers to reach the joints of the finger.

We can secure flat thin pieces of metal to the under periphery of ring or lever, and let the ring, when at rest, close over and give the form of a plain hoop-ring.

What we claim as our invention, and desire to secure by Letters Patent, is—

1. The levers *a* and *d*, hinge-joints *c* and *e*, cutters 1 and 2, spring 4, constructed as described and shown.

2. A ring-shaped lever cutting implement, operated by the finger, as specified and shown.

In testimony whereof we have signed our names to this specification before two subscribing witnesses.

FREDRICK EGGE.
ROBERT W. CHURCHILL.

Witnesses:
A. SKAATS,
LAURA A. HUBBELL.